United States Patent
Rao et al.

(10) Patent No.: US 11,617,102 B2
(45) Date of Patent: Mar. 28, 2023

(54) USER EQUIPMENT AND BUFFER STATUS REPORT CANCELLATION METHOD BASED ON CARRIER AGGREGATION AND INTEGRATED ACCESS AND BACKHAUL

(71) Applicant: Far EasTone Telecommunications Co., Ltd., Taipei (TW)

(72) Inventors: Herman Chunghwa Rao, Taipei (TW); Chen-Tsan Yu, Taipei (TW); Hua-Pei Chiang, Taipei (TW); Chyi-Dar Jang, Taipei (TW); Feng-Ming Yang, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 112 days.

(21) Appl. No.: 17/314,058

(22) Filed: May 7, 2021

(65) Prior Publication Data

US 2021/0368382 A1    Nov. 25, 2021

Related U.S. Application Data

(60) Provisional application No. 63/027,358, filed on May 20, 2020.

(30) Foreign Application Priority Data

Aug. 13, 2020   (TW) ................. 109127455

(51) Int. Cl.
  *H04W 28/02*   (2009.01)
  *H04W 28/12*   (2009.01)
  (Continued)

(52) U.S. Cl.
  CPC ....... *H04W 28/0278* (2013.01); *H04W 28/06* (2013.01); *H04W 28/12* (2013.01); *H04W 72/23* (2023.01)

(58) Field of Classification Search
  CPC . H04W 28/0278; H04W 28/06; H04W 28/12; H04W 72/1289
  See application file for complete search history.

(56) References Cited

U.S. PATENT DOCUMENTS 9,439,217 B2   9/2016   Feuersaenger et al.
9,699,744 B2   7/2017   Futaki
                (Continued)

FOREIGN PATENT DOCUMENTS

CN   109327857    2/2019
TW   201924427    6/2019
TW   202008221    2/2020

OTHER PUBLICATIONS

Samsung, KT, SK, Telecom, "PDCP Duplication support in high layer functional split", Jun. 27-29, 2017, 3GPP TSG-RAN WG3 Meeting Ad Hoc, pp. 1-4.

*Primary Examiner* — Ajay Cattungal
(74) *Attorney, Agent, or Firm* — JCIPRNET

(57) ABSTRACT

A user equipment and a buffer status report (BSR) cancellation method are provided. In the method, the data duplication is activated on at least one data unit of packet data convergence protocol (PDCP). The data duplication works such that, in the carrier aggregation (CA), one data unit corresponds to at least two component carriers provided by a base station supporting integrated access and backhaul (IAB) mechanism. For each data unit, at least two BSRs are triggered, and each BSR corresponds to one logical channel. Then, at least one BSR is canceled according to a canceling condition. Accordingly, the IAB network can be applied with multiple BSR cancellation.

8 Claims, 6 Drawing Sheets

(51) Int. Cl.
    *H04W 28/06*      (2009.01)
    *H04W 72/23*      (2023.01)

(56) References Cited

U.S. PATENT DOCUMENTS

| | | | | |
|---|---|---|---|---|
| 2015/0312957 | A1* | 10/2015 | Pelletier | H04W 74/04 |
| | | | | 370/329 |
| 2016/0338138 | A1* | 11/2016 | Pelletier | H04W 76/15 |
| 2018/0310202 | A1* | 10/2018 | Löhr | H04W 28/065 |
| 2018/0368132 | A1 | 12/2018 | Babaei et al. | |
| 2020/0053825 | A1 | 2/2020 | Hwang et al. | |
| 2020/0068651 | A1* | 2/2020 | Xu | H04W 80/02 |
| 2020/0084785 | A1 | 3/2020 | Tesanovic | |
| 2021/0368382 | A1* | 11/2021 | Rao | H04W 28/06 |
| 2022/0232523 | A1* | 7/2022 | Lee | H04W 72/0446 |
| 2022/0272721 | A1* | 8/2022 | Lee | H04W 28/0278 |

\* cited by examiner

USER EQUIPMENT AND BUFFER STATUS REPORT CANCELLATION METHOD BASED ON CARRIER AGGREGATION AND INTEGRATED ACCESS AND BACKHAUL

CROSS-REFERENCE TO RELATED APPLICATION

This application claims the priority benefit of U.S. provisional application Ser. No. 63/027,358, filed on May 20, 2020 and Taiwan application serial no. 109127455, filed on Aug. 13, 2020. The entirety of each of the above-mentioned patent applications is hereby incorporated by reference herein and made a part of this specification.

BACKGROUND

1. Technical Field

The disclosure relates to a radio resource management technology, and particularly relates to a user equipment (UE) and buffer status report (BSR) cancellation method.

2. Description of Related Art

In uplink (UL) resource scheduling, a user equipment is capable of sending a sounding reference signal (SRS) to notify a base station of quality of an uplink channel. Then, if the user equipment needs to transmit data but has not yet obtained an uplink resource, the user equipment may send a scheduling request (SR) to inform the base station about the resource demand. After receiving the scheduling request, the base station may allocate a small amount of resource, such that the amount of the data to be transmitted may be notified by the user equipment. Then, the user equipment may send a buffer status report on the amount of data, such that the base station may allocate the uplink resource for the amount. However, since uplink resources are limited and, inevitably, the triggered buffer status report may be cancelled, the user equipment needs to request resources again.

SUMMARY

The embodiments of the disclosure provide a user equipment and a buffer status report cancellation method, which enables cancellation of the buffer status report based on carrier aggregation (CA) and integrated access and backhaul (IAB) mechanisms.

A buffer status report cancellation method according to the embodiments of the disclosure applies to a user equipment and includes (but is not limited to) following steps: activating data duplication on at least one data unit of a packet data convergence protocol (PDCP), in which the data replication works such that, in carrier aggregation (CA), a data unit corresponds to at least two component carriers (CCs) provided by a base station supporting an integrated access and backhaul (IAB) mechanism; triggering at least two buffer status reports for each of the first data units, where each of the buffer status reports corresponds to a logical channel group (LCG); and cancelling the buffer status report of at least one of the logical channels according to a cancellation condition.

A user equipment according to the embodiments of the disclosure includes (but is not limited to) a transmitter and a processor. A transmitter transmits a signal; a processor is coupled to the transmitter, and is configured to: activate data duplication on at least one data unit of a packet data convergence protocol; trigger at least two buffer status reports for each of the data units; and cancel the buffer status report of at least one of the logical channels according to a cancellation condition. The data replication works such that, in carrier aggregation, the data unit corresponds to at least two component carriers provided by a base station supporting an integrated access and backhaul (IAB) mechanism. Each buffer status report (BSR) corresponds to one logical channel, and the buffer status report is transmitted via the transmitter.

Based on the above, in the user equipment and the buffer status report cancellation method according to the embodiments of the disclosure, an original data unit and a duplicated data unit may be respectively transmitted by using several component carriers provided by the base station supporting the integrated access and backhaul mechanism, and the buffer status report triggered for the data unit may be cancelled in response to the cancellation condition when it is met. In this way, the method may be applied to the integrated access and backhaul mechanism of the fifth generation (5G) mobile communication.

In order to make the features and advantages of the disclosure more comprehensible, the following specific embodiments are described in detail in conjunction with the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

BRIEF DESCRIPTION OF THE DRAWINGS

Figure 1:
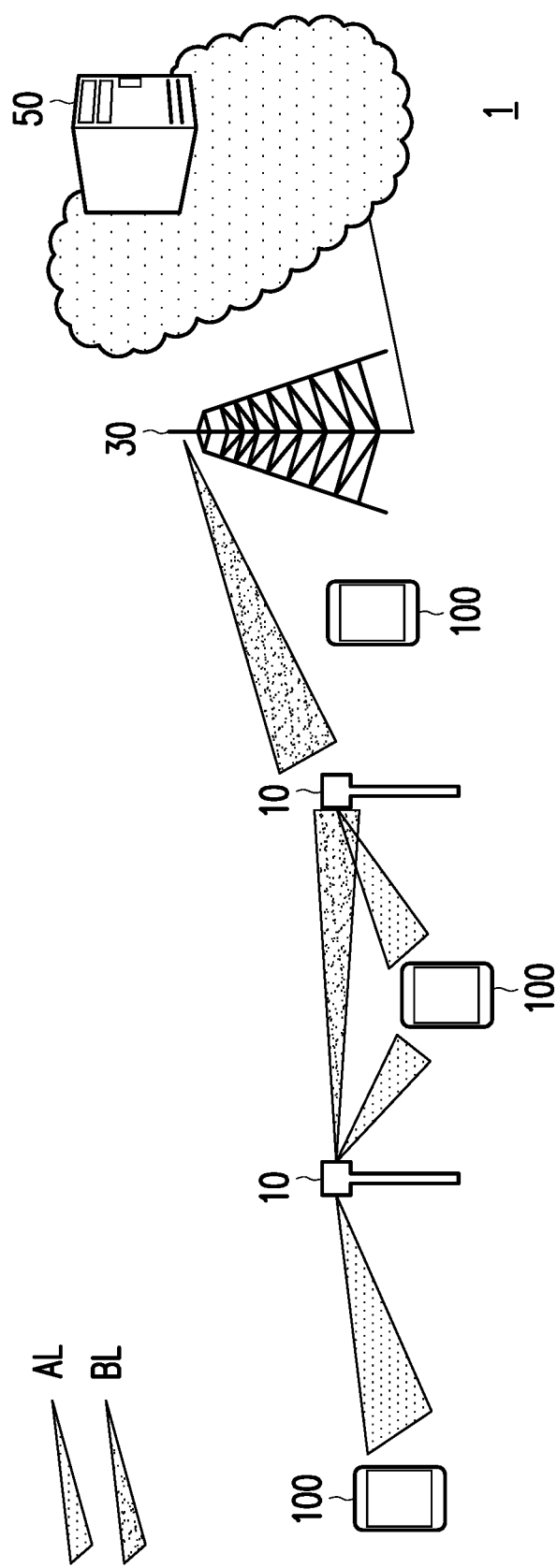
FIG. 1 is a schematic diagram of a communication system according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic diagram of a communication system 1 according to an embodiment of the disclosure. The communication system 1 includes (but is not limited to) at least one integrated access and backhaul (IAB)-node 10, at least one IAB-donor 30, at least one core network entity 50, and at least one user equipment 100.

The IAB-node 10 and the IAB-donor 30 are both base stations that support the IAB mechanism, and may be a next-generation node B (gNB), a home evolved node B (HeNB), a base transceiver system (BTS), a relay, a repeater, or other types of base stations.

In a 5G new radio (NR), the IAB mechanism is incorporated into the standard in release-16 of the third generation partnership project (3GPP), and may be applied to high-density deployed short-range access networks (for example, small cells). The IAB mechanism includes multiple-hop backhaul. For example, the IAB-node 10 or the IAB-donor 30 may provide an access link AL for the user equipment 100, and transmit data directly or indirectly (hopping) to other IAB-nodes 10 or IAB-donors 30 via a backhaul link BL. The access link AL and the backhaul link BL may use the same or different carrier frequencies (such as operating frequencies between 4 GHz to 30 GHz). In addition, in a Layer 2 (L2) relay, a quality of service (QoS) processing may be limited to a radio access network (RAN) layer, reducing signaling cost between core networks.

In order to implement the backhaul link BL, the IAB-node 10 may include functions of a mobile termination (MT) (which may be regarded as a component of a mobile device), the next-generation node B, or a distributed unit (which may be regarded as a component of the base station), so as to transfer the data coming from the user equipment 100, or from other IAB-nodes 10 or other IAB-donors 30.

On the other hand, functions of a next-generation node B may be split, such that one central unit (CU) and at least one distributed units (DUs) are formed. The central unit may be in charge of functions of a service data adaptation protocol (SDAP), a packet data convergence protocol (PDCP), or the like. The distributed unit may be in charge of functions of the radio link control (RLC), media access control (MAC), physical (PHY) layer, or the like. In some embodiments, the IAB-node 10 may form a distributed unit; the IAB-donor 30 may form a central unit, or both the distributed unit and the central unit.

The core network entity 50 is connected to the IAB-donor 30, and may be regarded as a certain network entity in the core network, and may be a server, a background host, a desktop computer or other devices.

There may be a variety of implementations for the user equipment 100, such as (but not limited to) mobile stations, advanced mobile stations (AMS), telephone devices, customer premise equipment (CPE), wireless sensors, or the like.

Figure 2:
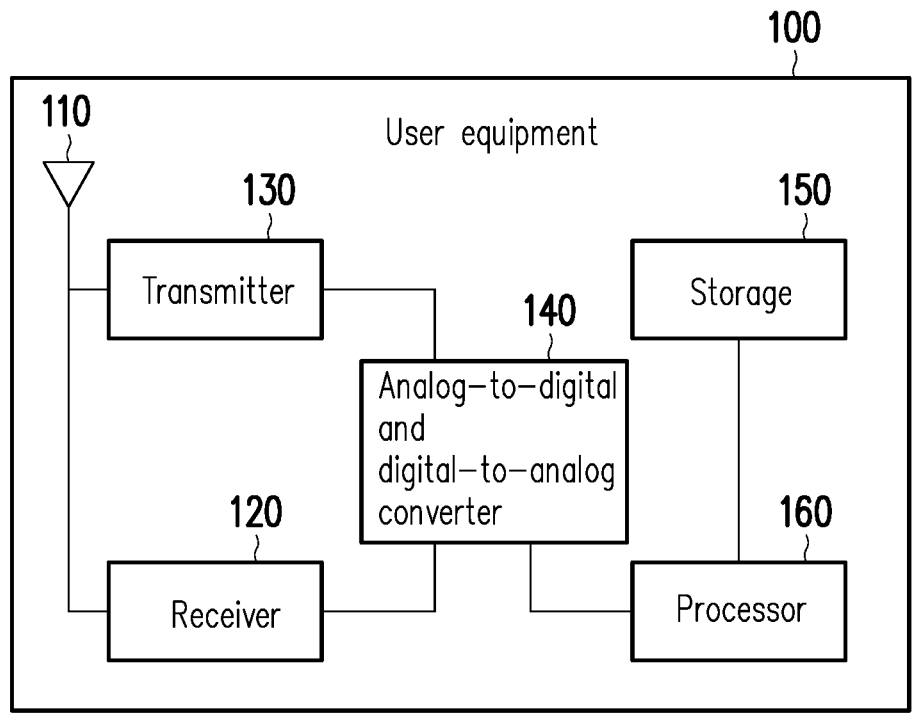
FIG. 2 is a component block diagram of a user equipment according to an embodiment of the disclosure.

FIG. 2 is a component block diagram of the user equipment 100 according to an embodiment of the disclosure. Please refer to FIG. 2. The user equipment 100 includes (but is not limited to) an antenna 110, a receiver 120, a transmitter 130, an analog-to-digital and digital-to-analog converter 140, a storage 150, and a processor 160. The antenna 110 is coupled to the receiver 120 and the transmitter 130. The analog-to-digital and digital-to-analog converter 140 is coupled to the receiver 120, the transmitter 130, and the processor 160. The processor 160 is further coupled to the storage 150.

The receiver 120 and the transmitter 130 are respectively configured to, wirelessly and via the antenna 110, receive a downlink signal and transmit an uplink signal. The receiver 120 and the transmitter 130 may also perform analog signal processings such as low noise amplification, impedance matching, frequency mixing, up-conversion or down-conversion, filtering, amplification and the like. The analog-to-digital and digital-to-analog converter 140 is configured to convert from an analog signal format to a digital signal format during downlink signal processing, and to convert from a digital signal format to an analog signal format during uplink signal processing.

The storage 150 may be any type of fixed or removable random access memory (RAM), read-only memory (ROM), flash memory, similar element, or a combination of the above elements. The storage 150 records program codes, device configurations, codebooks, buffered or permanent data, and records software modules and data that are related to various communication protocols such as RRC layer, PDCP layer, RLC layer, and MAC layer.

The processor 160 is configured to process digital signals and perform procedures according to the exemplary embodiments of the disclosure, and may access or load the data and software modules that are recorded by the storage 150. The functions of the processor 160 may be implemented by using a central processing unit (CPU), a microprocessor, a microcontroller, a digital signal processing (DSP) chip, a field programmable gate array (FPGA), and other programmable units. The functions of the processor 160 may also be implemented by an independent electronic device or an integrated circuit (IC), and the operation of the processor 160 may also be implemented by the software.

Hereinafter, the method according to the embodiment of the disclosure will be explained using each device and its components in the communication system 1. Each process of the method of the embodiment of the disclosure may be adjusted accordingly according to the implementation situation; the disclosure is not limited thereto.

Figure 3:
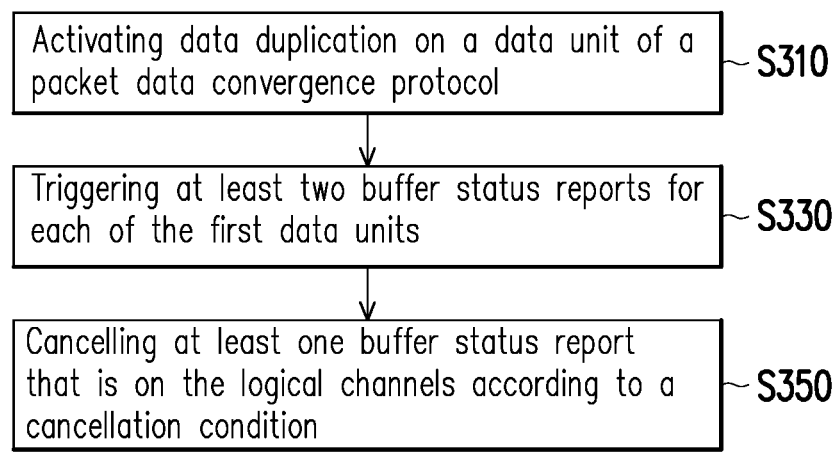
FIG. 3 is a flowchart of a method of canceling a buffer status report according to an embodiment of the disclosure.
Figure 4A:
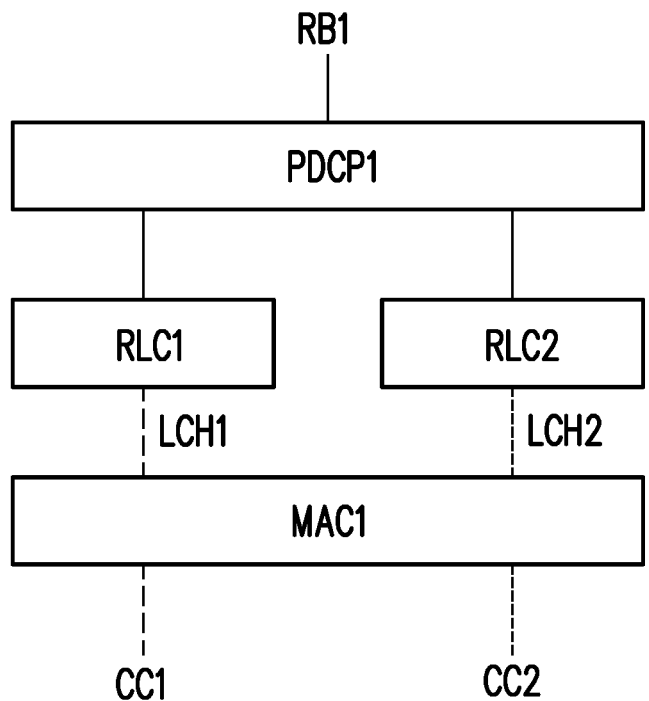
FIG. 4A is a schematic diagram illustrating no implementation of data duplication according to an embodiment of the disclosure.

FIG. 3 is a flowchart of a method of canceling a buffer status report according to an embodiment of the disclosure. Please refer to FIG. 3. The processor 160 of the user equipment 100 may activate data duplication of a data unit of the packet data convergence protocol (PDCP) (step S310). Specifically, the data unit may be a Protocol Data Unit (PDU) or in other types of resource formats. For a radio bearer (corresponding to one PDCP entity), the data unit of the PDCP may be transmitted through a logical channel (LCH) on at least one RLC entity. For example, FIG. 4A is a schematic diagram illustrating no implementation of data duplication according to an embodiment of the disclosure. Please refer to FIG. 4A. Taking the uplink as an example, two data units of a radio bearer RB1 are respectively transmitted through a logical channel LCH1 and a logical channel LCH2 of a RLC entity RLC1 and a RLC entity RLC2. When in carrier aggregation (CA), the two data units may be transmitted respectively by two component carriers (CCs) CC1 and CC2 provided by an IAB-node 10 or an IAB-donor 30 (if with a distributed unit function).

Figure 4B:
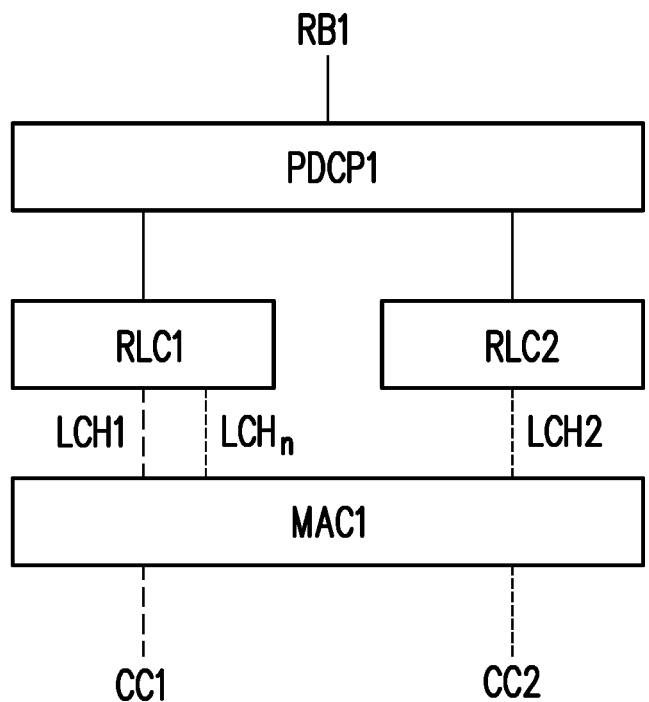
FIG. 4B is a schematic diagram illustrating implementation of data duplication according to an embodiment of the disclosure.

Different from dealing with a single data, the data duplication works such that one data unit (or a same type of traffic) of the PDCP corresponds to the at least two component carriers provided by one base station (for example, IAB-node 10 or IAB-donor 30) based on the IAB mechanism. For example, FIG. 4B is a schematic diagram illustrating implementation of data duplication according to an embodiment of the disclosure. Referring to FIG. 4B, the RLC entity RLC1 and its logical channel LCHn may be in charge of a duplicated data unit. Moreover, the data unit and its duplication are transmitted (corresponding to a MAC entity MAC1 or a base station) through the component carrier CC1 and the component carrier CC2, respectively. Thus, the same data unit can be transmitted twice, one time through the logical channel LCHn of the RLC entity RLC1, and the other time through the logical channel LCH2 of the RLC entity RLC2. In this way, the reliability may be increased and the time delay can be reduced.

It should be noted that only two RLC entities RLC1 and RLC2 are taken as examples in FIG. 4A and FIG. 4B. In other embodiments, there may be more RLC entities, more logical channels, or more component carriers. In addition, the aforementioned data unit of the PDCP refers to a data protocol data unit (data PDU).

Furthermore, in order to notify the IAB-node 10 or the IAB-donor 30 that the user equipment 100 supports the CA and the IAB mechanisms, "compliance with CA and IAB mechanisms" may be notified by the processor 160 via a MAC data unit on a data plane (e.g., a PDU or other data unit formats) of the transmitter 130, thereby reducing the signaling cost.

Figure 5:
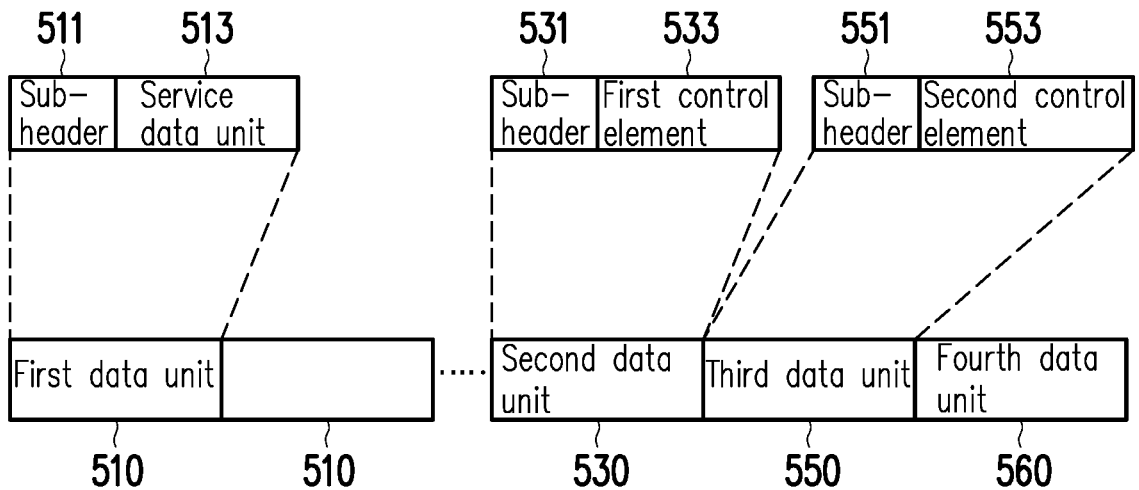
FIG. 5 illustrates a structure of a media access control data unit according to an embodiment of the disclosure.

FIG. 5 illustrates a structure of a media access control data unit according to an embodiment of the disclosure. Referring to FIG. 5, a MAC PDU may include four types of sub-data units. A first sub-data unit 510 includes a sub-header 511 and a service data unit (SDU) 513. A second sub-data unit 530 includes a sub-header 531, and a first control element (CE) 533 with a fixed length. A third sub-data unit 550 includes a sub-header 551, and a second CE 553 with a variable length. A fourth data unit 560 includes padding data.

Via, for example, the first CE 533 or the second CE 553, the user equipment 100 may notify the IBA-node 10 or the IAB-donor 30 of its "support of/compliance with CA and IAB mechanisms". For example, the content to be notified is indicated in an identity (LCID) field in the logical channel. Table (1) shows the value of the LCID field in the standard:

TABLE 1

| Index | LCID value |
| --- | --- |
| 0 | Common control channel (CCCH) |
| 1-32 | Logical channel identity |
| 33-51 | Reserved |
| 52 | CCCH |
| 53 | Recommended bit rate query |
| 54 | Multiple-entry power headroom report (PHR) |
| 55 | Configured grant confirmation |
| 56 | Multi-entry PHR |
| 57 | Single entry PHR |
| 58 | Cell radio temporary identity (C-RNTI) |
| 59 | Short truncated BSR |
| 60 | Long truncated BSR |
| 61 | Short BSR |
| 62 | Long BSR |
| 63 | Padding |

"Reserved" (for example, index 33-51) may be replaced by indications of "compliance with CA and IAB mechanisms". It should be noted that in other embodiments, the indications of "compliance with CA and IAB mechanisms" may also be put in other fields or other data in the header.

Figure 6:
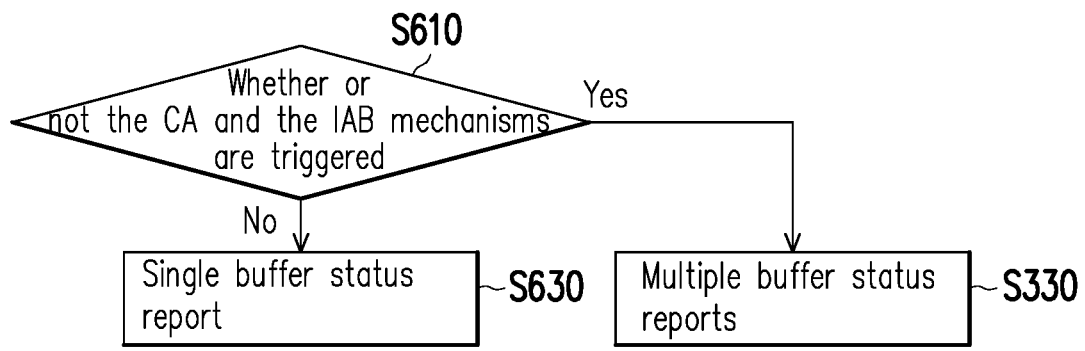
FIG. 6 is a flowchart illustrating triggering of a buffer status report according to an embodiment of the disclosure.

Next, the processor 160 triggers at least two buffer status reports for each data unit of the PDCP (step S330). Specifically, each buffer status report corresponds to one logical channel. FIG. 6 is a flowchart illustrating triggering of a buffer status report according to an embodiment of the disclosure. Please refer to FIG. 6. The processor 160 confirms whether or not the CA and the IAB mechanisms are triggered (step S610); for example, whether or not the indication of "compliance with CA and IAB mechanisms" has been transmitted. If the CA and the IAB mechanisms are not triggered, the processor 160 only needs to execute a single BSR. For example, in FIG. 4A, no data is duplicated and a data unit is transmitted via one logical channel only, so a BSR trigger of the MAC entity MAC1 only needs to trigger a single BSR for the data unit. If the CA and the IAB mechanisms have been triggered, the processor 160 executes multiple BSRs (step S330). For example, in FIG. 4B, the data is duplicated and the data unit and its duplication are respectively transmitted through different logical channels, so the BSR trigger of the single MAC entity MAC1 must trigger the BSRs for the data unit and its duplication. In other words, it is necessary to report to the base station the data amount of the data unit and of its duplication that are to be transmitted.

It is also worth noting that each of the buffer status reports correspond to a logical channel in different logical channel groups (LCG). Taking FIG. 4B as an example, the logical channel LCH2 and the logical channel LCHn belong to different logical channel groups. That is, the user equipment 100 transmits the BSR based on the logical channel group. In some embodiments, logical channels with the same service quality or priority may be classified into the same logical channel group, but may still vary according to actual needs.

It should be noted that FIG. 4B only takes one duplication as an example. In other embodiments, there may be more duplications.

When the uplink resource has been provided, the processor 160 may send a BSR, via the transmitter 130, indicating the data amount of the data unit and of its duplication. The BSR may be a periodic or a regular BSR. When the uplink resource has not been provided, the processor 160 may send a scheduling request (SR), via the transmitter 130, requesting for the resource so as to transmit the BSR.

Responsive to the transmission of the BSR, the processor 160 may determine whether or not a cancellation condition is met, and cancel the buffer status report of at least one of the logical channels according to the cancellation condition (step S350). Specifically, the cancellation condition is related to whether or not the uplink resource is obtained. The processor 160 may determine whether or not the uplink resource allocated by the IAB-node 10 is capable of accommodating a pending data unit (but may not be enough or sufficient to accommodate the MAC CE of the BSR and the sub-header). If the uplink resource is capable of accommodating a pending data unit (i.e. the uplink resource has been obtained), the processor 160 may cancel the buffer status report of the at least one of the logical channels. Taking FIG. 4B as an example, the processor 160 may cancel the triggered BSR on the logical channel LCHn by stopping a periodic BSR-Timer or a retrxBSR-timer. The processor 160 may also cancel the logical channel LCH2 in the other logical channel groups. Alternatively, the processor 160 may cancel the logical channels of all logical channel groups.

In another embodiment, the processor 160 may also activate a counter to record the number of times the BSR is transmitted for a specific data unit. If the number of times recorded by the counter exceeds a threshold but the corresponding uplink resource has not been obtained (maybe due to channel problems, network failures, or the like) (that is, the uplink resource has not been obtained), the processor 160 may cancel the buffer status report of the at least one of the logical channels.

Figure 7:
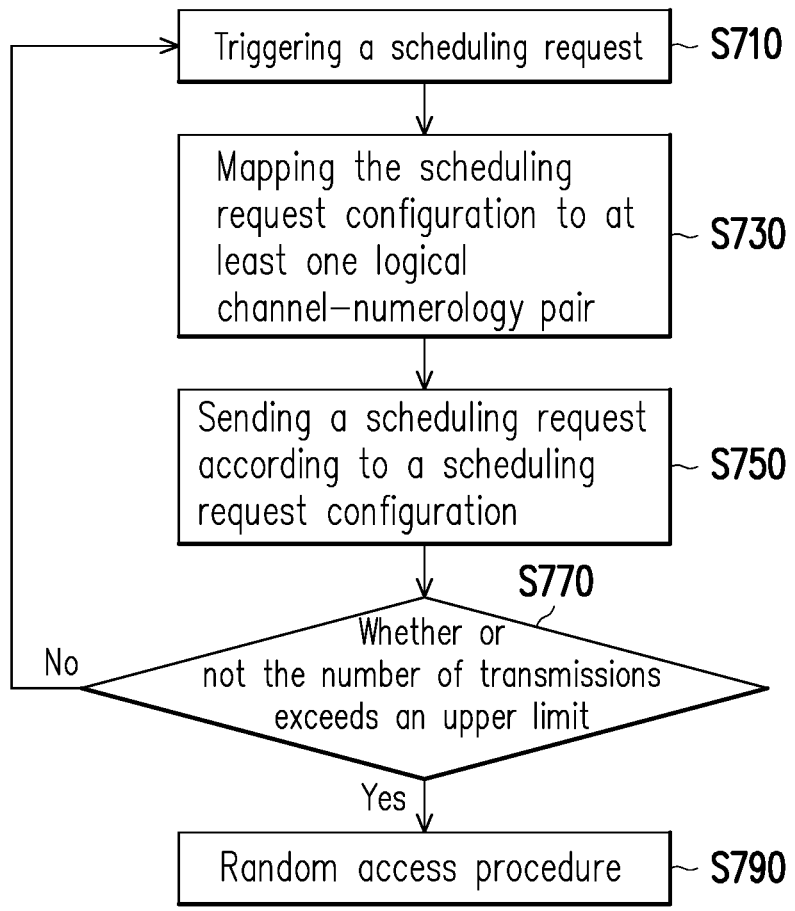
FIG. 7 is a flowchart illustrating triggering of a scheduling request according to an embodiment of the disclosure.

FIG. 7 is a flowchart illustrating triggering of a scheduling request according to an embodiment of the disclosure. Please refer to FIG. 7. When the BSR is cancelled or there is still other data to be transmitted on the logical channel, the processor 160 may trigger the scheduling request (SR) (step S710). SR is configured to request the uplink resource needed by a new transmission. The processor 160 may receive the scheduling request configuration through the receiver 120, such that the scheduling request configuration is corresponded to at least one logical channel-numerology pair (step S730). One logical channel may correspond to at least one numerology pair (respectively corresponding to a subcarrier space or a resource grid in a frequency domain). Any logical channel and its corresponding numerology may be called a logical channel-numerology pair.

The processor 160 may send the SR corresponding to a to-be-transmitted traffic according to the scheduling request configuration (step S750). It is worth noting that a SR scheduling corresponding to the scheduling request configuration is based on a capacity of the MAC data unit and a data type of the to-be-transmitted traffic. For example, the processor 160 may schedule multiple SRs for different traffics based on a solution to Unbounded Knapsack. It is supposed that the user equipment 100 is given the MAC PDU of a specific capacity C, and m types of scheduling request configurations are to be arranged (respectively corresponding to different data types, and related to channel quality indicators (CQI) or other priority indicators, for example). Furthermore, it is supposed that an i-th type of traffic contains duplicated data (i.e. the duplication obtained using the aforementioned data duplication mechanism), and the priority KU and the data size w[i] of an i-th type data (i, C, m, KU, and w[i] may be positive integers, and the number of duplications of each type may be assumed to be unlimited). One traffic occupies one MAC SDU. With i being 1-m, xi, that is the number of the i-th type traffic that may be selected into the MAC PDU, may be determined, such that maximum benefit may be obtained without exceeding the capacity C (for example, the higher the priority, the better; the lower the priority, the worse):

$$\max\{\Sigma_{i=1}^{m} p_i x_i : \Sigma_{i=1}^{m} w_i x_i \leq C\} \quad (1)$$

In other embodiments, the SR scheduling may also be obtained from other optimization methods. In some embodiments, via SR, the user equipment 100 may also report to the IAB-node 10 or the IAB-donor 30 a service type (for example, enhanced mobile broadband (eMBB), massive machine-type communications (mMTC), ultra reliable low latency communications (URLLC), fifth-generation (5G), or other generations of mobile communications technologies).

Next, the processor 160 determines whether or not the number of transmissions of the SR (for example, SR_counter) exceeds an upper limit (for example, dsr-TransMax) of the number of transmissions (step S770). If the number of transmissions has not exceeded the upper limit of the number of transmissions and the grant of the uplink resource (such as a UL grant) has not yet been received, the processor 160 resends the SR (return to step S710). If the number of transmissions exceeds the upper limit of the number of transmissions, the processor 160 may determine that there is a disconnection or out of synchronization with the IAB-node 10, thereby starting a random access (RA) procedure (step S790) accordingly.

Thus, the embodiment of the disclosure may provide a multi-BSR cancellation mechanism based on the CA and the IAB mechanisms. For the IAB mechanism, improved post-access multiplexing, multiple connectivity, and improved service quality on multiple hops may also be provided.

Figure 8:
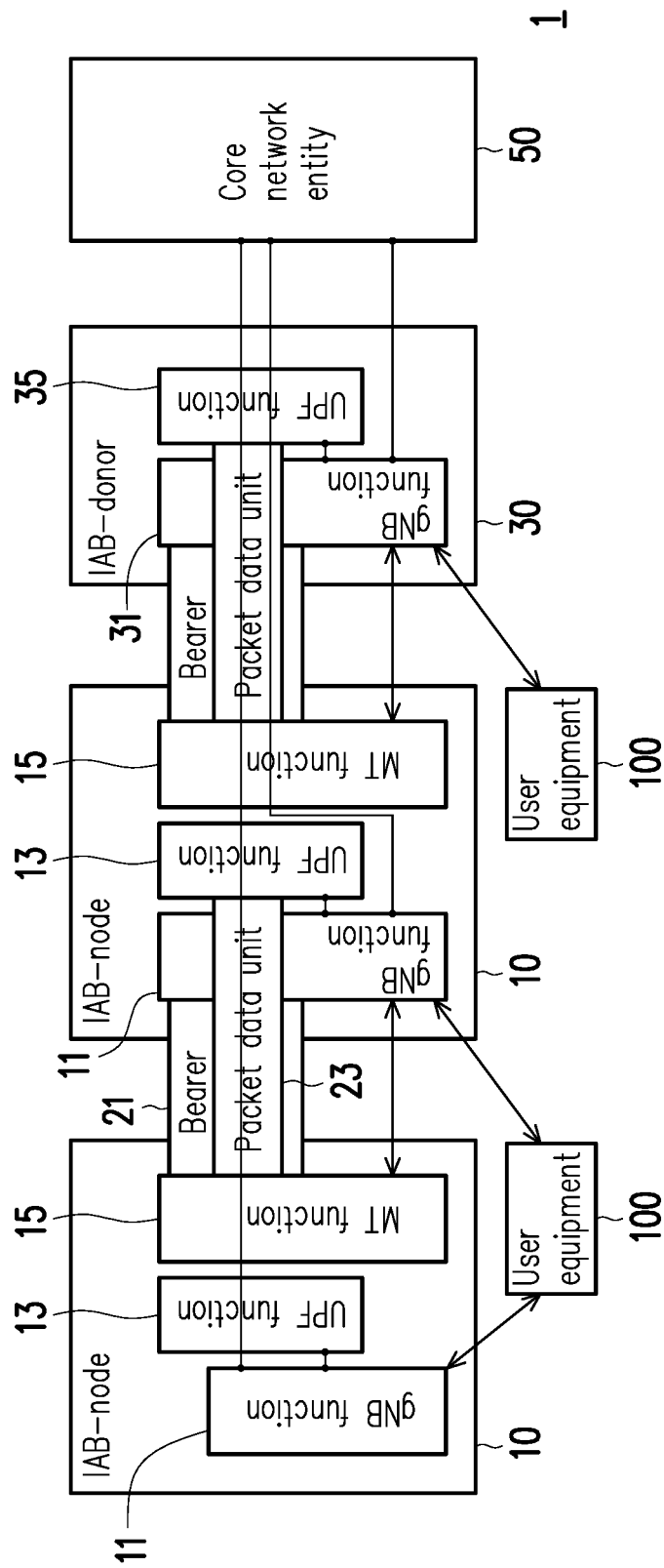
FIG. 8 is a schematic diagram of a communication system according to an embodiment of the disclosure.

FIG. 8 is a schematic diagram of a communication system 1 according to an embodiment of the disclosure. Please refer to FIG. 8. For an architecture of applying the IAB mechanism, the IAB-node 10 in the communication system 1 may include a gNB function 11, a user plane function (UPF) 13, and a mobile termination (MT) function 15; the IAB-donor 30 may include a gNB function 31 and a UPF function 35. In this way, a PDU session 23 of a specific radio bearer 21 may be established by connecting at least one IAB-node 10 to the IAB-donor 30. In addition, the embodiment of the disclosure provides a hardware controller that may run a network functions virtualization infrastructure (NFVI) manager and virtualization software. The network function virtualization platform may manage or monitor platform components, recover errors, and provide effective information security management, by using carrier-grade functions.

In summary, in the user equipment and the buffer status report cancellation method according to the embodiments of the disclosure, in a condition that the IAB-node supports CA mechanism, the data unit on the data plane is used to report to that "condition is met", thereby reducing the signaling cost. In addition, in the embodiments of the disclosure, multiple BSRs can be efficiently reported by the same MAC entity. In the embodiment of the disclosure, scheduling of the MAC SDU/SR is also executed earlier for the user equipment of NR, thereby increasing the success rate of uplink grant after the user equipment cancels the BSR, thereby reducing time delay of the uplink resource.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A buffer status report (BSR) cancellation method of a user equipment, the buffer status report cancellation method comprising:
    activating data duplication on at least one first data unit of a packet data convergence protocol (PDCP), wherein the data replication works such that, in carrier aggregation (CA), the first data unit corresponds to at least two component carriers (CCs) provided by a base station supporting an integrated access and backhaul (IAB) mechanism, and activating the data duplication on the at least one first data unit comprises:
        notifying "compliance with the carrier aggregation and the integrated access and backhaul mechanisms" via a second data unit of MAC on a data plane;
    triggering at least two buffer status reports for each of the first data units, wherein each of the buffer status reports corresponds to a logical channel (LCH); and
    cancelling the buffer status report of at least one of the at least two logical channels according to a cancellation condition.

2. The buffer status report cancellation method according to claim 1, wherein each of the at least two buffer status reports respectively corresponds to one of the logical channels in different logical channel groups (LCG).

3. The buffer status report cancellation method according to claim 1, wherein the cancellation condition is related to whether or not an uplink resource is obtained, and wherein steps of triggering the at least two buffer status reports further comprise:
    determining whether or not the uplink resource assigned accommodates the first data unit that is pending; and
    cancelling the buffer status report of the at least one of the at least two logical channels.

4. The buffer status report cancellation method according to claim 1, further comprising:
    receiving a scheduling request (SR) configuration, wherein, based on a capacity of a second data unit of MAC and a data type of a to-be-transmitted traffic, the scheduling request configuration is obtained; and sending at least one scheduling request corresponding to the to-be-transmitted traffic according to the scheduling request configuration.

5. A user equipment, comprising:
a transmitter, transmitting a signal;
a processor, coupled to the transmitter, and configured to:
   activate data duplication on at least one first data unit of a packet data convergence protocol, wherein the data replication works such that, in carrier aggregation, the first data unit corresponds to at least two component carriers provided by a base station supporting an integrated access and backhaul mechanism, and the processor is further configured to:
      notify "compliance with the carrier aggregation and the integrated access and backhaul mechanisms" via a second data unit of MAC on a data plane via the transmitter;
   trigger at least two buffer status reports for each of the first data units, wherein each of the buffer status reports corresponds to a logical channel, and wherein the at least two buffer status reports are transmitted via the transmitter; and
   cancel the buffer status report of at least one of the at least two logical channels according to a cancellation condition.

6. The user equipment according to claim 5, wherein each of the at least two buffer status reports respectively corresponds to one of the logical channels in different logical channel groups.

7. The user equipment according to claim 5, wherein the cancellation condition is related to expiration of a timer, wherein the timer is related to whether or not a radio resource is obtained, and wherein the processor is further configured to:
   activate the timer; and
   determine the expiration of the timer, and cancel the buffer status report of the at least one of the at least two logical channels.

8. The user equipment according to claim 5, further comprising:
a receiver, coupled to the processor, and receiving the signal, wherein the processor is further configured to:
   receive a scheduling request configuration via the receiver, wherein, based on a capacity of a second data unit of MAC and a data type of a to-be-transmitted traffic, the scheduling request configuration is obtained; and
   send at least one scheduling request corresponding to the to-be-transmitted traffic according to the scheduling request configuration via the transmitter.

* * * * *